United States Patent [19]
Ferdelman

[11] 3,799,245
[45] Mar. 26, 1974

[54] CONTROLS TO CYCLE FAN WITH ELECTRIC HEATER OR COMPRESSOR ON HEAT-COOL ROOM AIR CONDITIONER

[75] Inventor: Donald C. Ferdelman, Kettering, Ohio

[73] Assignee: General Motors Corporation, Detroit, Mich.

[22] Filed: Nov. 20, 1972

[21] Appl. No.: 308,238

[52] U.S. Cl. ................................................ 165/29
[51] Int. Cl. ............................................ F25b 29/00
[58] Field of Search ......................... 165/27, 29, 26

[56] References Cited
UNITED STATES PATENTS

| | | | |
|---|---|---|---|
| 3,318,372 | 5/1967 | Shell | 165/29 |
| 3,444,923 | 5/1969 | Kyle et al. | 165/29 |
| 3,499,482 | 3/1970 | Pinckaens | 165/26 |

*Primary Examiner*—Charles Sukalo
*Attorney, Agent, or Firm*—Edward P. Barthel

[57] ABSTRACT

A control system for a heat-cool room air conditioner which allows the user to select whether the fan motor should cycle on and off with the stage thermostat when a preselected temperature is reached while the unit is operating either during a heating or cooling mode.

3 Claims, 3 Drawing Figures

PATENTED MAR 26 1974　　　　　　　　　　　　　　3,799,245

| POSITION | | CIRCUIT | | | | | | | FUNCTION |
|---|---|---|---|---|---|---|---|---|---|
| | | A | B | C | F | G | D | E | |
| 1ST | FULL CCW | X | | | | X | X | X | LOW FAN & HEAT |
| 2ND | CW 60° | | X | | | X | X | X | HI FAN & HEAT |
| 3RD | CW 120° OFF | | | | | | | | OFF |
| 4TH | CW 180° | | | X | X | | | | HI FAN & COOL |
| 5TH | CW 240° | | X | | X | | | | MED. FAN & COOL |
| 6TH | CW 300° | X | | | X | | | | LOW FAN & COOL |

3,799,245

CONTROLS TO CYCLE FAN WITH ELECTRIC HEATER OR COMPRESSOR ON HEAT-COOL ROOM AIR CONDITIONER

This invention is directed to an improved control system for a heat-cool air conditioner using electric resistance heaters to heat the conditioned area.

In my U.S. Pat. No. 3,666,002 issued May 30, 1972, there is disclosed an air conditioner having electric heater means in which the fan motor runs continuously during either the electric heating cycle or the cooling cycle selected by a common manual rotary selector switch. It is an object of the present invention to provide an improved control system which allows the user the option to select whether the fan motor should run continuously or allow the fan motor to automatically cycle on and off with its two stage thermostat when a preselected temperature is reached irrespective of whether the unit's manual selector switch is positioned at a heating or cooling mode.

It is a further object of the invention to provide an improved control system for a heat-cool room air conditioner such that when its rotary selector switch is in one of its multiple cooling positions a dual stat single pole-double throw switch may be moved to its full automatic position causing a deenergized single pole-double throw relay to connect the fan motor circuit through one section of a dual stage thermostat allowing the compressor and fan motor to cycle on and off in unison with the thermostat. Upon the selector switch being rotated to one of its multiple heating positions and with the dual stat switch remaining in its full automatic position the coil of the relay is energized resulting in the relay placing the fan motor circuit through the stage thermostat whereby the fan motor cycles on and off in unison with the energization and deenergization, respectively, of the air conditioner resistance heater assembly.

Further objects and advantages of the present invention will be apparent from the following description, reference being had to the accompanying drawings wherein a preferred embodiment of the present invention is clearly shown.

In the Drawings:

FIG. 1 is a wiring diagram illustrating a control system for a heat-cool room air conditioning unit embodying one form of my invention;

Figure 3:
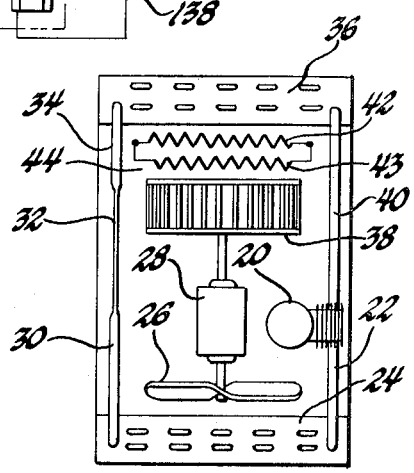
FIG. 3 is a diagrammatic view of an all season air conditioning unit to which the control system is applied.

Referring now to the drawings and more particularly to FIG. 3, there is shown diagrammatically an all season air conditioning system including a motor compressor unit 20 having its outlet 22 connected to the outdoor heat exchange coil 24 which transfers heat from a suitable compressed refrigerant to the outdoor air. This transfer is greatly increased by the outdoor air fan 26 which is operated by a fan motor 28. The circulation of the outdoor air in heat transfer with the outdoor coil 24 causes the condensation of the compressed refrigerant which is forwarded through line 30 to conventional restrictor means 32 for expansion and thence through line 34 to the indoor heat transver cooling or evaporator coil 36 where the refrigerant evaporates and absorbs heat from the air in the room to be cooled. This absorption of heat is increased by the indoor centrifugal cooling fan 38 which also is driven by the fan motor 28 and which circulates air from the conditioned area or room in heat transfer with the indoor cooling or evaporator coil 36.

The evaporator refrigerant returns from the coil 36 through line 40 to the compressor 20. An electrical resistance heater assembly is provided to furnish heat which comprises a pair of first and second resistance element heaters 42 and 43 disposed in duct 44 in the air conditioner spaced between the cooling coil 36 and the cooling fan 38. The electric resistance heaters 42 and 43 preferably are a pair of open coil heating elements disposed in a frame which supports both heating elements in a manner disclosed, for example, in U.S. Pat. No. 3,641,312 issued Feb. 8, 1972, to Ammerman, et al. In the disclosed embodiment the resistance wire is 18 gage having a cold-resistance of 14.6 ohms while each of the heaters 42 and 43 has a rating of 2500 watts at 230 volts to provide a two-stage heater assembly for operation at temperatures up to 2,100° F. When either one or both of the coils of the heater assembly are energized the air circulated through the cooling coil 36 by the cooling fan 38 is heated.

In FIG. 1 the supply conductor 12 connects to movable switch blades A and B of a 6-position manual rotary control selector switch through a conductor 10 connected from a first terminal block 50, while the movable switch blade C of the selector switch is connected to the terminal block 50 through the conductor 11. It will be seen that conductor 1 connects the third fixed contact of the switch blade A with the fan motor low speed winding 52 and the conductor 2 connects the third fixed contact of switch blade B to the junction of the low speed winding 52 and the medium speed winding 53 of the fan motor 28. The conductor 4 connects the third fixed contact of the switch blade C with the juncture of the medium speed winding 53 and the high speed winding 55 and with a second conductor 56 through normally closed bimetal motor protector switch 57 to phase winding 58 by means of conductor 59. The switch blade contacts A, B and C form first, second and third selective contacts of a first multiple selector switch means 60 for controlling the operation of the fan motor 28.

Figure 2:
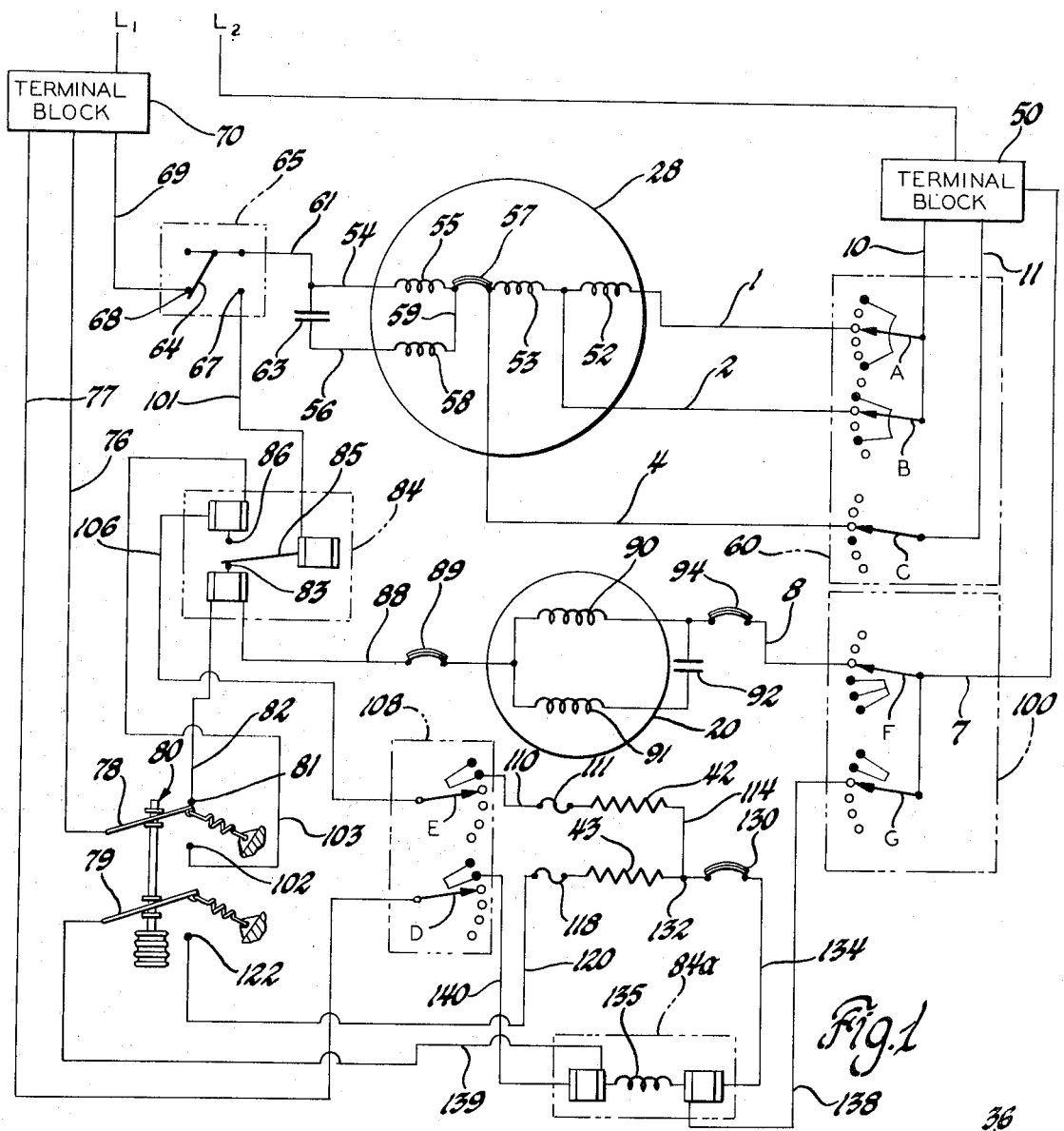
FIG. 2 is a chart showing the closed positions of the selector switch as "on" to perform the desired function.

The fan motor 28 may have any form of control desired to provide high, medium and low speed terminals. In the form shown a conductor 61 connects the other side of fan capacitor 63 and the high speed winding 55 to movable contact 64 of a single pole-double throw dual stat switch 65, preferably of the push button type, extending between a pair of fixed respective first and second fixed contacts 67 and 68. Conductor 69 connects the switch 65 with a second terminal block 70 which is in turn connected to the other line voltage supply conductor L1. By means of this circuit arrangement it will be seen in the chart of FIG. 2 that low speed fan and cooling mode is provided in the sixth (300° clockwise) position of the selector switch, low fan speed and heating mode is provided in the first low fan speed and heat position (0° full counterclockwise), a medium fan speed and cooling mode is provided in the fifth (240° clockwise), a fan speed and heating mode is provided in the second (60° clockwise) position and a high fan speed and cooling mode is provided in a fourth (180° clockwise) position, with the third position (120° clockwise) having no connection for providing an "OFF" setting.

When cooling is desired the selector switch is rotated to either the fourth, fifth or sixth positions such that the supply line L-1 connects through conductors 76, 77 from the terminal block 70 to respective first and second stage movable switch members 78 and 79 of a dual stage thermostat 80 having a bellows which is fluid responsive to room air temperature. The first stage switch member 78 is a single-pole, double-throw snap action movable contact and at higher room temperatures of the thermostat 80, such as for example 76° F., switch member 78 will be moved into engagement with an upper or first fixed contact 81 which is connected by a conductor 82 to first fixed contact 83 of a single-pole, double-throw relay 84 whose movable switch contact 85 is thrown from its one position engaging first fixed contact 83 into engagement with second fixed contact 86 by means of relay coil 84a the operation of which will be discussed below. The second stage switch member 79 is a single pole-single throw contact connected to line L-1 via conductor 77, blade D whose second fixed contact is connected by conductors 140 and 139 to switch member 79.

A conductor 88 connects relay contact 83 to an overload bimetal thermostat motor protector 89 which is in turn connected by a conductor to the main winding 90 and phase winding 91 of compressor motor 20. A conductor connects the opposite side of the compressor motor main winding 90 to running capacitor 92 while the junctions of the winding 90 and capacitor 92 are connected to a cut-out thermostat 94 which is in turn connected via conductor 8 to the third contact of movable switch blade F which is connected by conductor 7 to the terminal block 50 and thence to the supply conductor $L_2$ to complete the cooling or compressor circuit. The movable blade contact F together with a movable blade contact G form first and second selective contact means of a second multiple selector switch means 100 operative in both the cooling and heating phases of operation of the air conditioner system.

Thus, by means of applicant's rotary selector switch means 60, 100 and 108 in cooperation with relay means 84 and push button switch means 65 during the full automatic cooling mode of operation the fan motor 28 and the compressor motor 20 are cycled with the dual stage thermostat so that at certain selected times, such as in all night operation, when the room is cooled to a predetermined temperature the fan motor will be cycled-off in unison with the compressor to conserve electrical energy and eliminate the noise output of the impellers. It will be noted that the push button switch 65 has its fixed contact 68 connected by conductor 69 to terminal block 70 while its fixed contact 67 is connected by conductor 101 to movable contact arm 85.

In operation during its cooling mode, with the rotary selector switch in either the fourth, fifth or sixth position, if the dual stat switch 65 is placed in its full automatic position such that movable contact arm 64 engages first fixed contact 67 the fan motor 28 receives its power from $L_1$ through terminal block 70, conductor 76, movable contact arm 78, fixed contact 81 of the unsatisfied thermostat 80, conductor 82, fixed contact 83 of the relay 84, movable contact arm 85, conductor 101, first fixed contact 67 and movable contact 64 of the switch 65 and then to the fan motor via conductor 61. It will be noted that the thermostat's first stage movable contact 78 is in engagement with contact 81 when the room is warm and there is a demand for cooling.

The power circuit for the compressor motor 20 will include the same circuit enumerated immediately above through relay fixed contact 83 where the circuit will follow conductor 88 to energize the compressor motor 20. When the thermostat 80 is satisfied in that the room is cooled to a preselected temperature the movable contact arm 78 will snap to second fixed contact 102 simultaneously removing power from the fan motor and the compressor. Thus, in any of the three cooling modes of positions four, five and six and with dual stat switch 65 in its full automatic setting the fan motor is placed in parallel with compressor motor through the first stage of the thermostat 80 by means of the deenergized relay 84 allowing the fan motor and compressor motor to cycle on-and-off in unison.

When heating is desired the operator simply turns the rotary selector switch to either the first or second position. Thus, when the room temperature is lowered, for example to 72° F., the lost motion connection of the dual stage thermostat 80 will move the first stage switch arm 78 into engagement with its second or lower fixed contact 102 which connects through the conductor 103 through the second fixed contact 86 of the relay 84 and thence by means of conductor 106 to the movable contact blade E of third selector switch means 108. The switch blade E has its upper first and second contacts connected by the conductor 110 and fuse 111 to first heating element 42 of the two stage heater while the opposite end of coil 42 is connected by conductor 114 to second heating element 43 and thence via fuse 118 and conductor 120 to lower or second fixed contact 122 of the second stage portion of thermostat 80. An overload or heater safety thermostat 130 is connected from junction 132 of the heaters 42 and 43 by conductor 134 to the solenoid 135 of the relay coil 84a while the conductor 138 connects the same end of solenoid coil 135 to the third fixed contact of the movable contact blade G connected via conductor 7 to the terminal block 50 and thence to the supply conductor $L_2$ to complete the heating circuit. The movable switch blades D and E form first and second selective contacts of third multiple selector switch means 108 such that the second fixed contact of blade D is connected by conductor 140 to the opposite side of solenoid 84a.

With the movable contact 64 push button switch 65 in engagement with second fixed contact 68 and the selector switch in the fourth, fifth or sixth position the dual stage thermostat 80 operates as follows. If the thermostat should be set at 70° F., as long as the temperature remains 70° F. the conductor 82 will be connected via conductor 88 to the compressor motor 20 with the relay movable contact 85 in engagement with fixed contact 83. If the temperature falls below 70° F., the movable switch arm 78 snaps downwardly into engagement with the stationary contact 102 removing power to the compressor but the fan motor will continue to run. If the selector switch is in the first or second position and the temperature falls below 70° F., the movable switch arm 78 operates as above and connects to conductor 103, fixed contact 86 and conductor 106 to the heating switch blade E of the selector switch means 108. The conductor 110 allows current to flow through the heater 42 and conductors 114, 134 and 138, switch blade G and conductor 7 to terminal L₂ to energize the first stage heater 42 and supply one-half heat. If the room temperature falls further for example to 68° F., then the second stage movable switch 79 will move downwardly to engage the stationary contact 122 which connects the conductor 120 to the second stage heating element 43 such that it is energized along with heating element 42.

It will be appreciated that the solenoid coil 135 of the relay 84 will be energized when the rotary selector switch is in either of its first or second heating mode positions by providing an electrical path through conductor 140, switch blade D, conductor 77 to terminal block 70 and line L₁. With the solenoid coil 135 energized movable contact 85 of relay 84 will be moved into engagement with second fixed contact 86. Thus, if the unit is placed in full automatic operation by having movable contact 64 of the dual stat switch 65 contacting first fixed contact 67 a power supply circuit is established for the fan motor 28 via line L₁, terminal block 70, conductor 76, movable contact arm 78 of the thermostat, second fixed contact 102, conductor 103, second fixed relay contact 86, movable relay contact 85, conductor 101, first fixed contact 67 and movable contact 64 of switch 65, conductors 61 and 54 to the fan motor 28 and via either conductor 1 or 2 and switch blades A or B, conductor 10 and terminal block 50 to L₂ to complete the fan motor circuit. The result is that with the dual stat switch 65 in its full automatic position and the thermostat 80 operating in its first stage so as to go from one-half heat supplied by first heating element 42 to no heat the fan motor will automatically cycle on-and-off in unison with the first stage of the thermostat 80 in a comparable manner as when the fan motor is automatically cycled on-and-off in unison with the compressor motor during a cooling mode of operation. It will be noted that when second stage movable contact 79 is moved to contact 122 it is connected to coil 135 via conductor 139.

While the embodiment of the invention as herein disclosed constitutes a preferred form, it is understood that other forms might be adopted.

I claim:

1. A control system for a room air conditioning unit operable to selectively heat or cool air, the combination of a motor compressor; a condenser, an evaporator and a restrictor member coupled between said evaporator and said condenser; a fan driven by an electric motor for blowing room air to be cooled over said evaporator; electric resistance heater means disposed between said fan and said evaporator providing for heating the circulating air; a circuit for controlling the operation of said unit including first and second supply conductors for connecting said motor compressor, said fan motor and said heater means to an alternating current power source; a multi-position manual rotary control connected in said circuit for operating said unit in either a heating or cooling mode, thermostatic switch means having a double throw switch member connected to said first supply conductor and having first and second double throw fixed contacts, a single pole-double throw relay having first and second fixed switch contacts and a movable contact, a manual single pole-double throw fan cycle switch having a movable contact engageable with either a first semi-automatic fixed contact or a second full automatic fixed contact, said relay movable contact connected to said first fixed contact of said fan cycle switch, said thermostatic switch first fixed contact connected to the first fixed contact of said relay which is in turn connected to said motor compressor, said thermostatic switch second fixed contact connected to the second fixed contact of said relay, said relay first fixed contact connected to said motor compressor unit and said relay second fixed contact connected through said rotary control to said heater means, said relay coil connected to said thermostatic switch means, said fan cycle switch movable contact connected to said fan motor; whereby when said rotary control switch is positioned in its cooling mode and said manual fan cycle switch movable contact engaging said full automatic fixed contact said relay coil is deenergized causing said relay movable contact to contact said relay first fixed contact enabling said fan motor to cycle on and off in unison with said compressor; and whereby when said rotary control switch is positioned in its heating mode and said fan cycle switch engaging said full automatic fixed contact said relay coil is energized causing said relay movable contact to be moved into engagement with its second fixed contact enabling said fan motor to cycle on and off in unison with the energization of said heater means by said thermostatic switch movable contact.

2. A control system for a room air conditioning unit operable to selectively heat or cool air, the combination of a motor compressor; a condenser, an evaporator and a restrictor member coupled between said evaporator and said condenser; a fan driven by an electric motor for blowing room air to be cooled over said evaporator; first and second electric resistance heaters disposed between said fan and said evaporator providing means for heating the circulating air; a circuit for controlling the operation of said unit including first and second supply conductors for connecting said motor compressor, said fan motor and said heater means to an alternating current power source; a multi-position manual rotary control connected in said circuit for operating said unit in either a heating or cooling mode; a dual stage thermostatic switch means having a first stage double throw switch member and a second stage single throw switch member, said first stage double throw switch member connected to said first supply conductor and having first and second double throw fixed contacts, a single pole-double throw relay having first and second fixed switch contacts and a movable contact, a manual single pole-double throw fan cycle switch having its movable contact engageable with either a first semi-automatic fixed contact or a second full automatic fixed contact, said relay movable contact connected to said first fixed contact of said fan cycle switch; said first stage first fixed contact connected to said relay's first fixed contact which is in turn connected to said motor compressor, said first stage second fixed contact connected to said relay's second fixed contact, said relay having its first fixed contact connected to said motor compressor unit and its second fixed contact conected through said rotary control to said first heater, said second stage fixed contact connected to said second heater, said first and second heaters having a common terminal connected to an operating coil for said relay, said relay coil connected to said second stage movable contact member, and said fan cycle switch movable contact arm connected to said fan motor; whereby when said rotary control switch is positioned in its cooling mode and said manual fan cycle switch movable contact engaging said full automatic fixed contact said relay coil is deenergized causing said relay movable contact to contact said relay first fixed contact enabling said fan motor to cycle on and off in unison with said compressor; and whereby when said rotary control switch is positioned in its heating mode and said fan cycle switch engaging said full automatic fixed contact said relay coil is energized causing said relay movable contact to be moved into engagement with its second fixed contact enabling said fan motor to cycle on-and-off in unison with the energization of said first heater by said first stage movable contact of said dual stage thermostatic switch.

3. A control system for a room air conditioning unit operable to selectively heat or cool air, the combination of a motor compressor, a condenser, an evaporator and a restrictor member coupled between said evaporator and said condenser, a fan driven by an electric motor for blowing room air to be cooled over said evaporator, first and second electric resistance heaters disposed between said fan and said evaporator providing the sole means for heating the circulating air; and circuit means for controlling the operation of said motor compressor, said fan motor and said electric heater means; said circuit including first and second supply conductors for connecting said motor compressor, said fan motor and said heater means to an alternating current power source; a multi-position manual rotary control including first, second and third multiple selector switch means; said first multiple selector switch means connected to said second supply conductor having at least one selective contact connected to said fan motor, a dual stage thermostatic switch having a first stage double throw switch member connected to said first supply conductor and having first and second fixed contacts; a single pole-double throw relay having first and second fixed contacts and a movable contact, a manual single pole-double throw fan cycle switch having its movable contact engageable with either a first semi-automatic fixed contact or a second full automatic fixed contact; said relay movable contact connected to said first fixed contact of said fan cycle switch; said first stage first fixed contact connected to said relay's first fixed contact, said first stage second fixed contact connected to said relay's second fixed contact, said relay having its first fixed contact connected to said motor compressor and its second fixed contact connected to a first selective contact means of said second multiple selector switch means, said second stage fixed contact connected to one terminal of said second heater, said first and second heaters having a common terminal connected to an operating coil for said relay, said relay coil in turn connected to said second stage movable contact member, said fan cycle switch movable contact arm connected to said fan motor; said relay coil connected to second selective contact means of said third multiple selector switch means; the other terminal of said compressor motor unit connected to first selective contact means of said second multiple selector switch means; whereby when said rotary control switch is positioned in its cooling mode and said fan cycle switch movable contact moved to engage said full automatic fixed contact said relay coil is deenergized resulting in said fan motor cycling on-and-off in unison with said compressor motor; whereby when said rotary control switch being positioned in its heating mode and said fan cycle switch engaging said full automatic fixed contact said relay coil is energized causing said relay movable contact to be moved into engagement with its second fixed contact enabling said fan motor to cycle on-and-off in unison with the energization of said first heater by said first stage movable contact.

* * * * *